Figure 1:
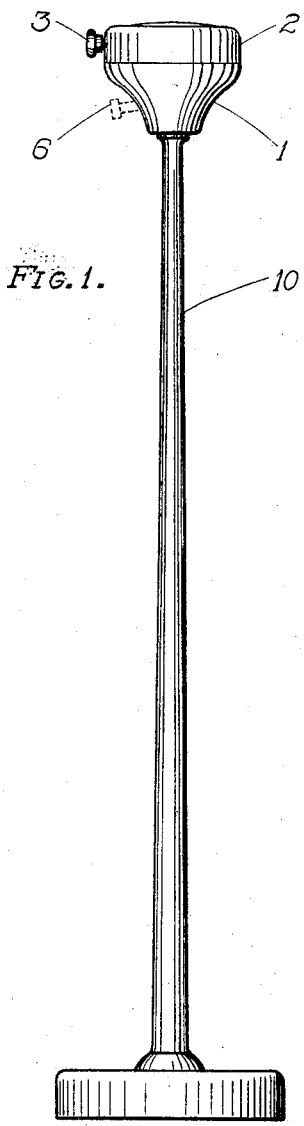

Nov. 29, 1932.        J. S. ANDREWS        1,889,118
GEAR SHIFT LEVER KNOB
Filed Nov. 26, 1928

INVENTOR.
JOHN S. ANDREWS
BY
A. B. Bowman
ATTORNEY.

Patented Nov. 29, 1932

1,889,118

UNITED STATES PATENT OFFICE

JOHN S. ANDREWS, OF LOS ANGELES, CALIFORNIA, ASSIGNOR TO PHILIP LAUX, OF SANTA ANA, CALIFORNIA

GEAR SHIFT LEVER KNOB

Application filed November 26, 1928. Serial No. 321,799.

My present invention relates to gear shift lever knobs, and to such knobs for supporting clocks, and to means for securing knobs or other devices to gear shift levers, or other members, in such manner that the knobs or other devices can not be readily removed by unauthorized persons.

The objects of this invention are: first, to provide a knob from which a clock or other timepiece which forms a part of the knob may be easily removed and also readily replaced without the employment of tools and without disturbing or removing the main supporting portion of the knob relative to or from a gear shift lever or other member on which it is mounted; second, to provide a novel yieldable and resilient mounting for a clock or other timepiece in a knob of the character mentioned, whereby the clock or timepiece, or any other device, may be readily positioned and secured within the knob without difficulty and with little force and which may be removed from the knob without danger of the clock, or any other member, being instantly forced from the knob or other support when the securing means of the former relative to the knob or other supporting means is detached or unloosened; third, to provide novel means for detachably securing a knob or other device, to a permanent member so that the former may be easily and quickly secured to the latter and whereby, by the removal of a key, special screw, or the like, the knob, or other device, can not be removed from the permanent member by any unauthorized person without a great deal of difficulty and without damaging the structure to such an extent that the same may be used again, the knob or other device being so secured to the permanent member that when the key, special screw, or other means is removed, the knob or other device can be only rotated relative to the permanent member; fourth, to provide a structure of this class whereby, when the knob or other device is secured in position to the permanent member and the key, special screw, or the like, is removed, the knob or other device may be rotated to any position most convenient for the handling or manipulation of the knob or other device; fifth, to provide a knob or other device of this class in which may be mounted a reducing bushing so that the knob or other device may be readily secured to gear shift levers or other permanent members of varying size, the bushing being so arranged with the other portions of the structure that the same cannot be removed readily, and which does not alter the functions of the structure hereinbefore mentioned; sixth, to provide, as a whole, a novelly constructed gear shift lever knob or other device of this class; and, seventh, to provide a knob or other device of this class which is simple and economical of construction, durable, efficient, attractive in appearance, one which forms a good grip for the hand and which will not readily deteriorate or get out of order.

Figure 2:
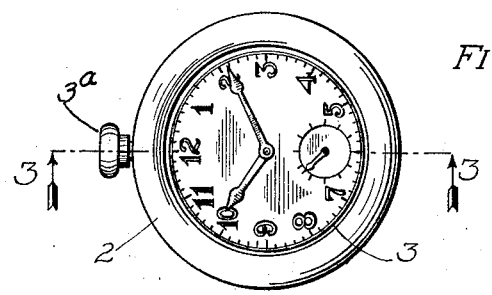
Figure 3:
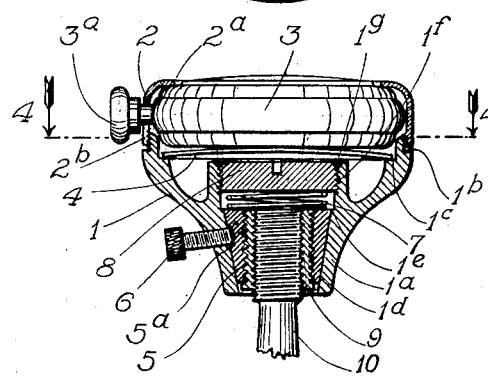
Figure 4:
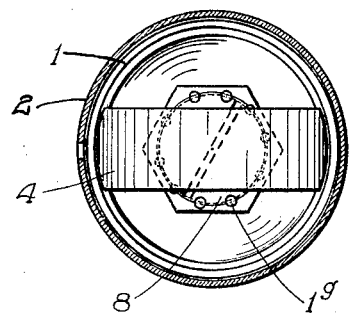
Figure 5:
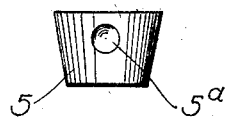

With these and other objects in view, as will appear hereinafter, my invention consists of certain novel features of construction, combination and arrangement of parts and portions, as will be hereinafter described in detail and particularly set forth in the appended claims, reference being had to the accompanying drawing and to the characters of reference thereon in which:

Figure 1 is a side elevational view of an automobile gear shift lever in one form showing my knob embodying my invention mounted at the upper end of the lever; Fig. 2 is an enlarged top view thereof; Fig. 3 is a fragmentary sectional elevational view thereof taken through 3—3 of Fig. 2, showing certain parts and portions in elevation to facilitate the illustration; Fig. 4 is an end view taken at 4—4 of Fig. 3, showing the clock and securing member for the clock removed; and, Fig. 5 is an elevational view of a bushing for rotatably supporting the knob relative to the gear shift lever.

Like characters of reference refer to similar parts and portions throughout the views of the drawing.

The present embodiment of my invention, as shown in the drawing, consists essentially of a pair of casing members 1 and 2, a clock 3 mounted within the casing formed by the members 1 and 2, a spring 4 yieldably positioning the clock within the casing, a supporting bushing 5, a screw 6 positioning the bushing 5 non-revolubly within the casing member 1, a spring 7 for providing frictional engagement between the bushing 5 and the casing member 1, and a screw or plug 8 for applying pressure on and securing the spring 7 in position.

The casing members 1 and 2, when attached together, as shown, form a continuous knob or grip for shifting the gear shift lever 10 on which it is mounted. The member 1 is preferably cast and comprises a large hollow upper portion, forming a part of the casing, and a reduced downwardly extending boss or shank 1a, the two portions merging in gradual curved lines. The upper end of the casing member is provided with an externally threaded portion 1b which is slightly smaller in diameter than the greatest diameter thereof. To this threaded portion is secured the internally threaded portion at the lower end of the casing member 2 which is annular and provided at its upper side with an inwardly extending flange 2a which merges with the larger diameter portion in gradual curves.

Within the upper portion of the casing member 1 and the interior of the casing member 2 is positioned the clock 3 which, in this instance, is small and substantially in the form of a watch, the face of which is directed upwardly. The clock is held in position by the inwardly extending flange 2a and is forced thereby against the spring 4. This spring is a relatively thin curved steel or other resilient plate which extends as a strip across the interior of the member 1 and is supported at its opposite ends on an annular shoulder 1c within and inwardly from the upper end of the casing member 1. By such a spring and mounting thereof, very little distortion of the spring will provide sufficient resiliency against the inner side of the clock to hold the same yieldably against the flange 2a, and will permit the clock to be easily secured in position, and will permit the same to be removed from the casing without danger of having the clock fly out of its socket when the casing member 2 is removed.

The winding and setting stem 3a of the clock extends outwardly through a slot 2b in the side of the casing member 2, such slot permitting also the positioning of the clock within the member 2 from the lower open side thereof.

The lower end or boss 1a of the casing member 1 is tapered at its interior, the walls thereof converging upwardly, as indicated by 1d, the tapered portion terminating at its upper end in a recess 1e which is formed in an upward projection or boss 1f which extends upwardly from the lower portion of the interior of the casing member 1. Within the tapered bore 1d is positioned the externally tapered bushing 5, the taper thereof conforming with the tapered bore 1d. The lower or small end of the bushing falls short of the lower end of the boss 1a, so that the bushing is inaccessible from the exterior or lower end of the member 1. The bushing 5 is held against rotation relative to the member 1 by a key, or screw, 6 which will be described more specifically hereafter. When the key or screw 6 is removed, the bushing 5 is held in frictional engagement with the bore 1d by a spring 7 which is positioned at the lower end of the recess 1e and is held in position therein by the screw 8 which, in this instance, is in the form of a plug screwably secured within the upper end of the recess 1e. The screw or plug is adapted to be retained permanently in such position after the tension of the spring 7 is suitably adjusted, the ready removal of the plug from the recess being effected by crick punching either the member 1 or the plug 8, or both, at their engaging portions, as indicated by 1g in Figs. 3 and 4.

The tapered bushing 5 is internally threaded and is adapted to be secured to the threaded end of the gear shift lever 10 or other member, either directly or indirectly. In order to accommodate the bushing 5 to the various diameters of threads at the outer ends of the gear shift levers or other members, it may be necessary to provide an accommodating bushing 9, shown in Fig. 3, which bushing is exteriorly threaded and screwed into the bushing 5 and internally threaded to meet the threads on the gear shift lever or other member. The lower end of the accommodating bushing 9 is provided with a flange which seats against the lower end of the bushing 5 so that the two bushings may be tightly secured together. The flange of the bushing 9 is, however, preferably positioned within or upwardly from the lower end of the member 1 so that the latter bushing 9 cannot be easily removed from the gear shift lever. Thus, for the purpose herein, the bushings 5 and 9 may be considered an integral or unitary member.

In order to secure the whole knob to the gear shift lever, the screw 6 is screwed into the boss or shank of the casing member 1 and into a recess 5a at the exterior portion of the tapered bushing. After the knob is secured in position, the screw 6 is removed and retained as a key. In order to facilitate the securing of the member 1 to the gear shift lever, I have provided at the lateral sides of the upwardly extending boss 1f within the casing member 1 flat surfaces or a polygonal outline, simulating a nut so that this portion can be readily gripped by a wrench for securing the member 1 in position to the gear shift lever while the screw 6 is in position as stated.

The screw 6 is provided with a special or unusual thread and also preferably of unusual diameter so that a stock or standard screw could not be used for locking the members 1 and 5 relative to each other. In order to prevent other instruments from being placed within the threaded socket for the screw for temporarily locking the members 1 and 5 relative to each other, the recess 5a in the bushing 5 is well rounded so that considerable force must be applied against the bushing 5 for locking the same relative to the member 1, which force can not be obtained ordinarily without having the special screw intended for the particular purpose.

If it is desired to remove the clock for repairs, or for adjustment, the same may be readily removed by holding the casing member 1 with one hand and unscrewing the cover or casing member 2 with the other. The functioning of the device as a knob is not in any way disturbed by the removal of the clock, since the member 2 can be readily replaced without the clock.

Though I have shown and described a particular construction, combination and arrangement of parts and portions, and a particular application or incorporation of my invention to a clock mounting in a knob for gear shift levers, I do not wish to be limited to this particular construction, combination and arrangement, nor to the application or incorporation disclosed, but desire to include in the scope of my invention the construction, combination and arrangement substantially as set forth in the appended claims.

Having thus described my invention, what I claim as new and desire to secure by Letters Patent is:

1. In a device of the class described, the combination with a permanent support, of a supporting member having a bore at one end into which one end of the permanent support extends, a bushing positioned within the bore and secured to the end of the permanent support, a closure member for the bore secured and enclosed within the supporting member to prevent removal of the bushing, and a spring positioned between the bushing and the closure member providing considerable frictional engagement between the bushing and the walls of the supporting member against which the bushing is positioned.

2. In a device of the class described, the combination with a permanent support, of a supporting member having a bore at one end into which one end of the permanent support extends, a bushing positioned within the bore and secured to the end of the permanent support, a closure member for the bore secured within the supporting member to prevent removal of the bushing, a spring positioned between the bushing and the closure member providing considerable frictional engagement between the bushing and the walls of the supporting member against which the bushing is positioned, and a removable key extending through the side wall of the supporting member into engagement with the bushing for locking the bushing temporarily to the supporting member.

3. In a device of the class described, the combination with a permanent support, of a supporting member having a bore at one end into which one end of the permanent support extends, a bushing positioned within the bore and secured to the end of the permanent support, a closure member for the bore secured within the supporting member to prevent removal of the bushing, a spring positioned between the bushing and the closure member providing considerable frictional engagement between the bushing and the walls of the supporting member against which the bushing is positioned, and a removable key extending through the side wall of the supporting member, said bushing having a shallow recess in its peripheral surface into which said key is adapted to extend for temporarily locking said bushing to said supporting member.

4. In a device of the class described, the combination with a permanent support, of a supporting member having a bore at one end into which one end of the permanent support extends, a bushing positioned within the bore and secured to the end of the permanent support, a closure member for the bore secured within the supporting member to prevent removal of the bushing, a spring positioned between the bushing and the closure member providing considerable frictional engagement between the bushing and the walls of the supporting member against which the bushing is positioned, and a special threaded key screw extending through the supporting member into engagement with said bushing for temporarily locking said supporting member against rotation relative to said bushing.

5. In a device of the class described, the combination with a permanent support, of a supporting member having a bore at one end into which one end of the permanent support extends, a bushing positioned within the bore and secured to the end of the permanent support, a closure member for the bore secured within the supporting member to prevent removal of the bushing, a spring positioned between the bushing and the closure member providing considerable frictional engagement between the bushing and the walls of the supporting member against which the bushing is positioned, and a special threaded key screw extending through the supporting member into engagement with said bushing for temporarily locking said supporting member against rotation relative to said bushing, said bushing having a shallow recess for receiving the inner end of said screw.

6. In a device of the class described, the combination with a permanent support, of a supporting member having a bore at one end into which one end of said permanent support extends, a bushing positioned within said bore and secured to said permanent support, the end of said bore, opposite the aforementioned end of the supporting member, being closed to prevent withdrawal of said bushing, and a key extending through said supporting member into engagement with said bushing for temporarily locking the supporting member against rotation relative to the bushing, said key being removable from the supporting member permitting free rotation of the supporting member relative to the bushing.

7. In a device of the class described, the combination with a permanent support, of a supporting member having a bore at one end into which one end of said permanent support extends, a bushing positioned within said bore and secured to said permanent support, the end of said bore, opposite the aforementioned end of the supporting member, being closed to prevent withdrawal of said bushing, and a key extending through said supporting member into engagement with said bushing for temporarily locking the supporting member against rotation relative to the bushing, said key being removable from the supporting member permitting free rotation of the supporting member relative to the bushing, the bushing being positioned substantially wholly within the bore to prevent ready access to the bushing and to prevent its ready removal from the permanent support.

8. In a device of the class described, the combination with a permanent support, of a supporting member having a bore at one end into which one end of said permanent support extends, a bushing positioned within said bore and secured to said permanent support, the end of said bore, opposite the aforementioned end of the supporting member, being closed to prevent withdrawal of said bushing, and a special threaded screw extending through the supporting member into engagement with the bushing for temporarily locking the supporting member against rotation relative to the bushing.

9. In a device of the class described, the combination with a permanent support, of a supporting member having a bore at one end into which one end of said permanent support extends, a bushing positioned within said bore and secured to said permanent support, the end of said bore, opposite the aforementioned end of the supporting member, being closed to prevent withdrawal of said bushing, and a special threaded screw extending through the supporting member into engagement with the bushing for temporarily locking the supporting member against rotation relative to the bushing, said bushing being provided with a shallow recess for receiving the inner end of the special screw to facilitate the securing of the supporting member to the bushing.

10. In a device of the class described, the combination with a permanent support, of a supporting member hollow at one end and provided with a central bore at the opposite end of the supporting member, there being provided within the hollow portion an extension extending into the hollow portion and forming an elongation of said bore, a bushing rotatably mounted within the bore and secured relative to the permanent support, a closure member closing the elongated end of the bore, and a removable key temporarily securing said supporting member to said bushing to prevent rotation of the supporting member relative to the bushing, said extension having a polygonal portion to facilitate the rotation of the supporting member and the securing of the bushing to the permanent support.

11. In a device of the class described, the combination with the supported end of a supporting member, said end provided with a tapered bore diverging inwardly, a tapered bushing rotatably mounted within the tapered bore, a closure member for the bore positioned over the inner end of the bore to prevent withdrawal of the bushing, a spring positioned between the bushing and the closure member, and a removable key in the supporting member adapted to engage positively the bushing for locking the supporting member against rotation relative to the bushing to facilitate securing of the bushing to the supporting member.

In testimony whereof, I have hereunto set my hand at Los Angeles, California, this 9th day of October, 1928.

JOHN S. ANDREWS.